(12) United States Patent
Brand (10) Patent No.: US 8,418,702 B2
(45) Date of Patent: Apr. 16, 2013

(54) READY MIX TRUCK WASH

(76) Inventor: Shadley F. Brand, Dassel, MN (US)

( * ) Notice: Subject to any disclaimer, the term of this patent is extended or adjusted under 35 U.S.C. 154(b) by 567 days.

(21) Appl. No.: 12/589,946

(22) Filed: Oct. 30, 2009

(65) Prior Publication Data

US 2010/0108100 A1  May 6, 2010

Related U.S. Application Data (60) Provisional application No. 61/197,980, filed on Oct. 31, 2008.

(51) Int. Cl.
*B08B 3/02* (2006.01)

(52) U.S. Cl.
USPC ........... 134/123; 134/184; 134/198; 134/199; 239/450

(58) Field of Classification Search .................... 134/34, 134/123, 18, 26, 56 R, 57 R, 184, 198, 199; 15/DIG. 2; 239/450
See application file for complete search history.

(56) References Cited

U.S. PATENT DOCUMENTS

| | | | | | |
|---|---|---|---|---|---|
| 2,676,600 | A | * | 4/1954 | Vani et al. | 134/123 |
| 2,751,915 | A | * | 6/1956 | Roberts | 134/123 |
| 2,987,067 | A | * | 6/1961 | Vani et al. | 134/99.2 |
| 3,167,797 | A | * | 2/1965 | Hergonson | 15/3 |
| 3,339,563 | A | * | 9/1967 | Ordonez | 134/57 R |
| 3,384,123 | A | * | 5/1968 | Saddison | 138/34 |
| 3,786,823 | A | | 1/1974 | Wiley | |
| 3,996,948 | A | | 12/1976 | Wiley | |
| 4,739,779 | A | * | 4/1988 | Jones et al. | 134/45 |
| 5,266,123 | A | | 11/1993 | Brand | |
| 7,143,771 | B2 | | 12/2006 | Kaipainen | |
| 7,252,095 | B2 | | 8/2007 | Watt | |
| 7,305,998 | B2 | | 12/2007 | Watt | |
| 2002/0112748 | A1 | | 8/2002 | Niland | |
| 2005/0174879 | A1 | | 8/2005 | Bentley et al. | |

* cited by examiner

*Primary Examiner* — Michael Kornakov
*Assistant Examiner* — Ryan Coleman
(74) *Attorney, Agent, or Firm* — Kinney & Lange, P.A.

(57) ABSTRACT

A ready mix truck wash system includes at least one spray arch fluidly connected to a pump, a motor, and controls. The spray arch has a plurality of pipes and spray nozzles configured to spray pressurized fluid onto a ready mix truck. In one embodiment, the ready mix truck is washed in multiple stages.

10 Claims, 8 Drawing Sheets

READY MIX TRUCK WASH

CROSS-REFERENCE TO RELATED APPLICATION(S)

This application claims the benefit of U.S. Provisional Application Ser. No. 61/197,980, filed on Oct. 31, 2008, which is hereby incorporated by reference in its entirety.

BACKGROUND

The present invention relates to systems and methods for washing vehicles. More particularly, the present invention relates to systems and methods for washing ready mix trucks.

In the concrete business, it is necessary to wash ready mix trucks on a regular basis. After both loading and unloading, trucks should be thoroughly washed in order to remove any material accumulated on the exterior surface.

SUMMARY

One embodiment of the present invention is a truck wash system including a first spray arch. The first spray arch has first and second pipes extending horizontally and in parallel, as well as third and fourth pipes extending horizontally and in parallel. The third and fourth pipes are arranged at a positive angle with respect to the first and second pipes. The first spray arch also has brackets extending vertically upwards from the first and second pipes to suspend the first spray arch from a support structure, and a plurality of spray nozzles located along at least some of the pipes for directing pressurized fluid at a truck. The system further includes a pump for supplying pressurized fluid to the pipes, a motor for driving the pump, and controls for starting the motor to initiate the truck wash system.

Another embodiment of the present invention is a method of washing trucks including the steps of pumping pressurized fluid through a system of stationary pipes and spraying the pressurized fluid out of spray nozzles located on a first set of the stationary pipes for a first predetermined amount of time. The method also includes waiting for a second predetermined amount of time after spraying the pressurized fluid out of the spray nozzles located on the first set of stationary pipes, and spraying the pressurized fluid out of spray nozzles located on a second set of the stationary pipes for a third predetermined amount of time.

In an alternative method of washing trucks, pressurized fluid is pumped through a system of pipes forming a first suspended spray arch, then spraying the pressurized fluid out of spray nozzles located on the first spray arch for a first predetermined amount of time. This embodiment also includes waiting for a second predetermined amount of time after spraying the pressurized fluid out of the spray nozzles located on the first spray arch, pumping pressurized fluid through a system of pipes forming a second suspended spray arch, and spraying the pressurized fluid out of spray nozzles located on the second spray arch for a third predetermined time.

DETAILED DESCRIPTION

Figure 1:
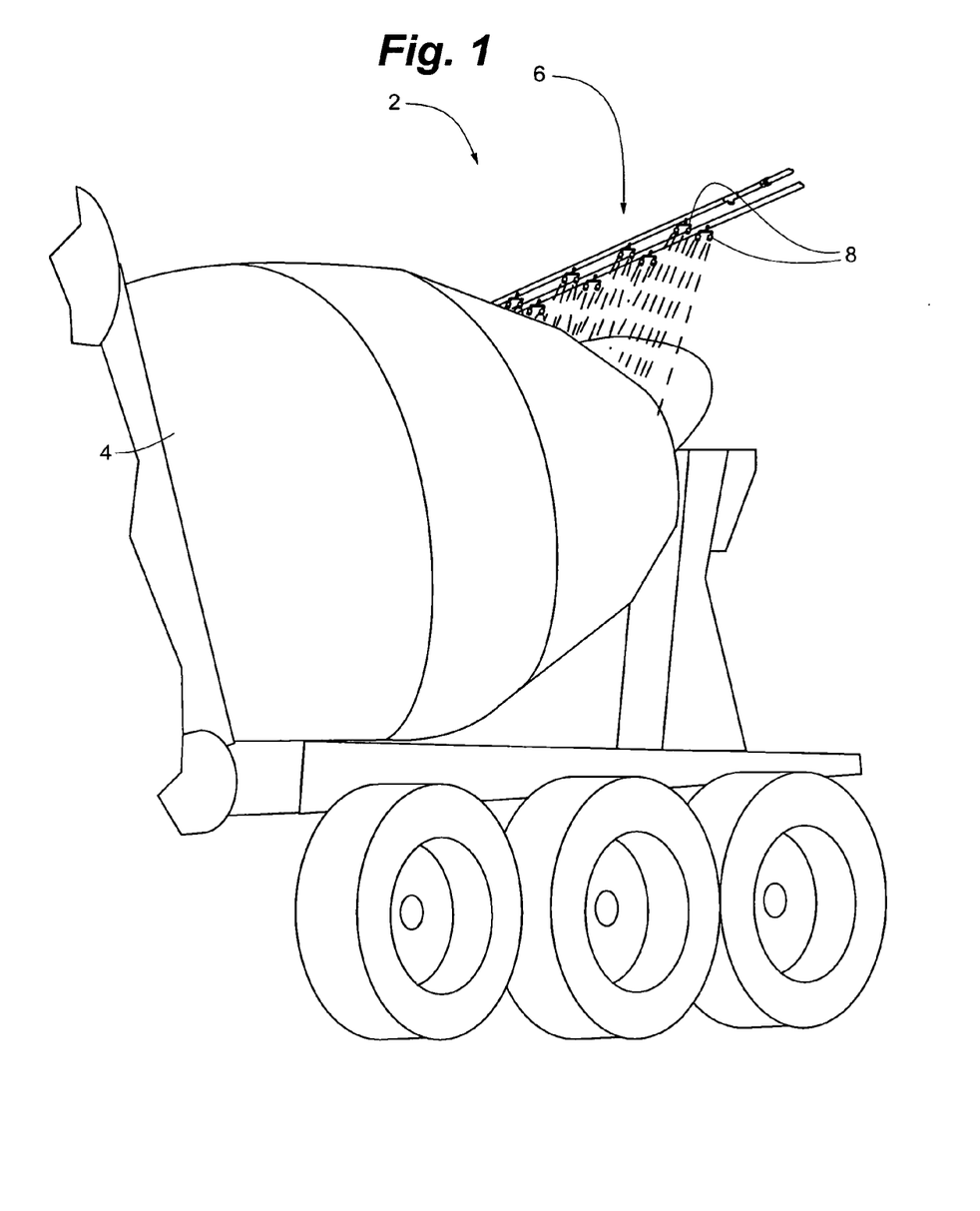
FIG. 1 is a perspective view of one embodiment of a ready mix truck wash system in accordance with the present invention.

FIG. 1 is a perspective view of one embodiment of ready mix truck wash system 2. Ready mix truck wash system 2 is an apparatus suspended above ready mix truck 4 and configured for washing an outside surface of ready mix truck 4. The outside surface of ready mix truck 4 includes, but is not limited to, a cowling, a chute, tags, wheels, and an inside surface of a charge hopper. As known to one skilled in the art, ready mix truck 4 is available in several designs, such as front or rear loading. As used herein, the term "ready mix truck" is meant generally and includes any vehicle used in the construction and concrete industries.

In order to wash ready mix truck 4, a driver positions ready mix truck 4 at least partially beneath one or more spray arches 6. Ready mix truck wash 2 is turned on and a fluid (such as, but not limited to water) is pumped through an assortment of pipes arranged into spray arch 6. Attached along the pipes of spray arch 6 are spray nozzles 8, which are pointed toward any area of truck 4 that needs washing. The pressurized fluid exits spray nozzles 8 and contacts the outside surface of truck 4.

Both spray arch 6 and spray nozzles 8 are adjustable so that they conform to customer needs. Usually, a customer will choose a particular configuration of one or more spray arches 6 and a plurality of spray nozzles 8. The spray arches 6 and spray nozzles 8 are then customized through assembly and adjustment at the customer's site. Ultimately, spray arches 6 and spray nozzles 8 are fixed into a stationary and permanent configuration forming ready mix truck wash system 2. The advantages of ready mix truck wash system 2 and methods for using ready mix truck wash system 2 are detailed further below.

Figure 2:
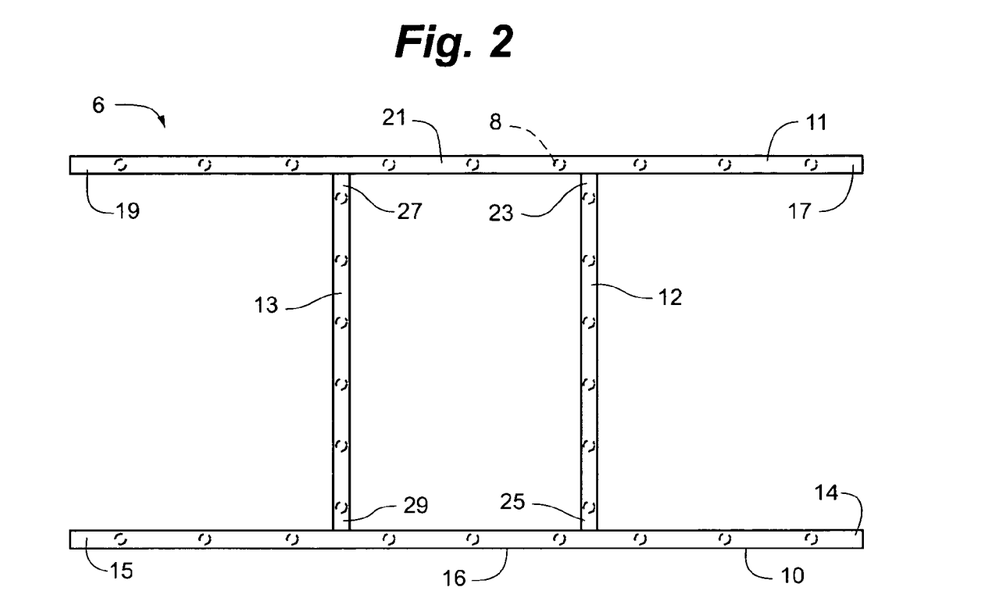
FIG. 2 is a top view of one embodiment of a spray arch for use with the ready mix truck wash system.
Figure 3:
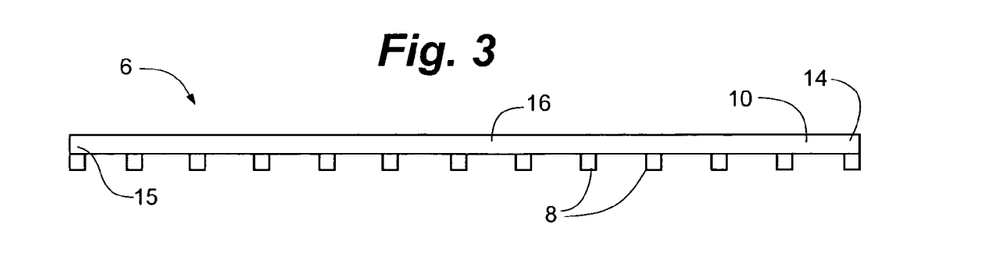
FIG. 3 is a side view of the spray arch from FIG. 2.

FIG. 2 is a top view and FIG. 3 is a side view of a first embodiment of spray arch 6 for use with ready mix truck wash system 2. Spray arch 6 includes at least four pipes: first pipe 10, second pipe 11, third pipe 12, and fourth pipe 13. In the depicted embodiment, the pipes are formed from stainless steel and have a diameter of approximately one inch (25.40 millimeters), although other suitable materials and sizes of pipes are contemplated for constructing spray arch 6. First pipe 10 and second pipe 11 extend horizontally with respect to the ground and are approximately parallel to each other. Third pipe 12 and fourth pipe 13 also extend horizontally with respect to the ground and are approximately parallel to each other, but are not oriented parallel to first pipe 10 and second pipe 11. Third pipe 12 and fourth pipe 13 are arranged at a positive angle with respect to the pipe 10 and the second pipe 11. In the depicted embodiment, third pipe 12 and fourth pipe 13 are oriented perpendicular to first pipe 10 and second pipe 11. In the depicted embodiment, third pipe 12 and fourth pipe 13 are connected to first pipe 10 and second pipe 11 at right angles)(90°), although other angles are contemplated. First pipe 10, second pipe 11, third pipe 12, and fourth pipe 13 are coplanar with one another.

First pipe 10 has first end 14, opposing second end 15, and center portion 16 located approximately halfway between first end 14 and second end 15. Similarly, second pipe 11 has first end 17, opposing second end 19, and center portion 21 located approximately halfway between first end 17 and second end 19. Third pipe 12 has first end 23 attached to second pipe 11 at a location between center portion 21 and first end 17. Third pipe 12 has second end 25 attached to first pipe 10 at a location between center portion 16 and first end 14. Fourth pipe 13 is assembled into spray arch 6 in a manner similar to third pipe 12. Fourth pipe 13 has first end 27 attached to second pipe 11 at a location between center portion 21 and second end 19. Fourth pipe 13 has second end 29 attached to first pipe 10 at a location between center portion 16 and second end 15. So configured, first pipe 10, second pipe 11, third pipe 12, and fourth pipe 13 collectively form a structure resembling a ladder. While spray arch 6 depicted in FIG. 2 shows first pipe 10, second pipe 11, third pipe 12, and fourth pipe 13 attached to one another, the invention is not so limited. So long as the pipes are located in proximity to each other and form a ladder type configuration similar to that described above, spray arch 6 will function as intended.

Located along first pipe 10, second pipe 11, third pipe 12, and fourth pipe 13 are a plurality of spray nozzles 8 for directing pressurized fluid at ready mix truck 4, as shown in FIG. 1. Various types of adjustable spray nozzles 8 can be used such as, but not limited to, turbo nozzles, fan nozzles, zero degree nozzles, and spinner nozzles. Spray nozzles 8 can have one or more spraying heads and can be spaced evenly along the pipes, or grouped together. As shown in FIG. 3, spray nozzles 8 have a first end attached to first pipe 10 and have a second sprayer end that extends at an approximately right angle toward the ground. In use, a fluid is passed through the pipes, such as first pipe 10, to spray nozzles 8 for washing a ready mix truck 4 in accordance with ready truck mix truck wash system 2.

Figure 4:
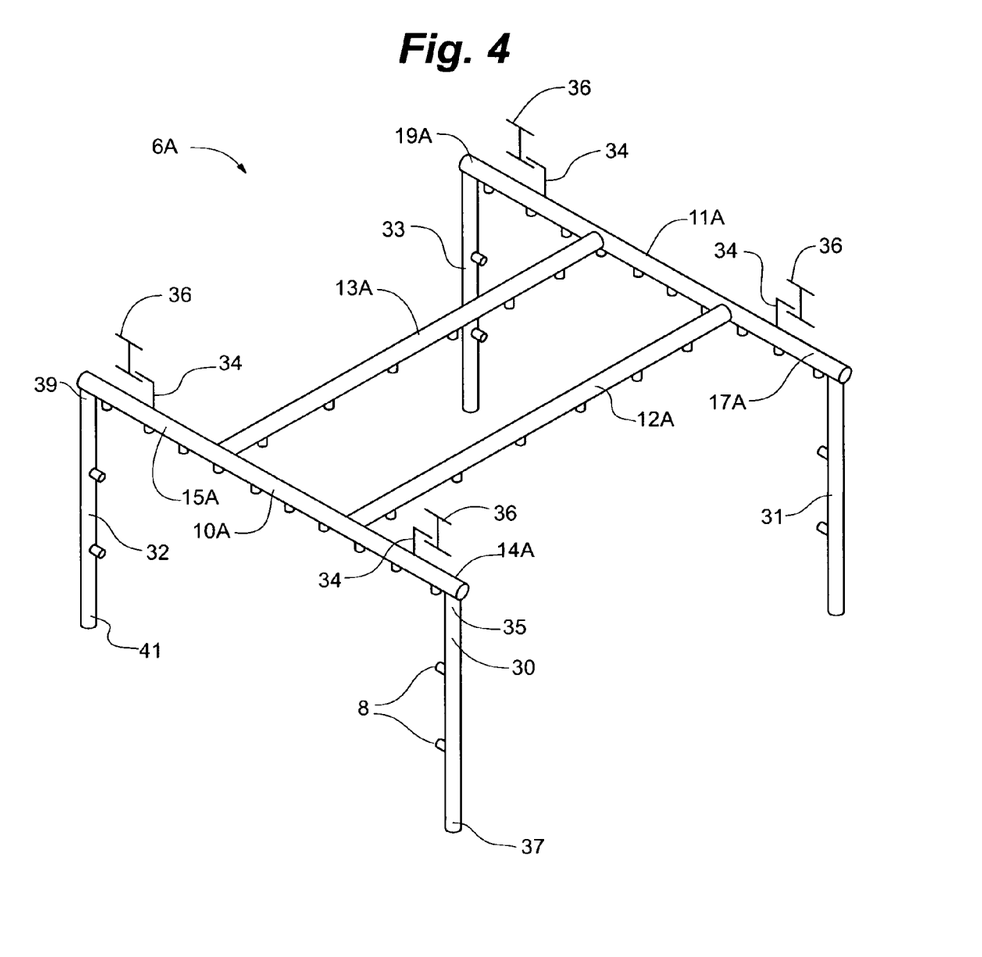
FIG. 4 is a perspective view of an alternative embodiment of the spray arch.

FIG. 4 is a perspective view of a second embodiment of spray arch 6A. Spray arch 6A is similar to spray arch 6 described above with reference to FIGS. 2 and 3. Viewed from the top, pipes of spray arch 6 would look much like spray arch 6, because spray arch 6A also has four horizontally extending pipes forming a ladder configuration (first pipe 10A, second pipe 11A, third pipe 12A, and fourth pipe 13A). As such, the same numbering conventions are used for spray arch 6A and only a perspective view of spray arch 6A is shown with emphasis on the differences between spray arch 6 and spray arch 6A. Spray nozzles 8 are distributed along the pipes of spray arch 6A, just as described with respect to spray arch 6 in FIGS. 2 and 3. Spray arch 6A differs from spray arch 6 in that spray arch 6A also includes four vertically extending pipes (fifth pipe 30, sixth pipe 32, seventh pipe 31, and eighth pipe 33), as well as brackets 34 cooperating with I-beams 36.

As shown in FIG. 4, fifth pipe 30 and sixth pipe 32 extend vertically downwards and in parallel to each other. Fifth pipe 30 has first end 35 and an opposite second end 37. First end 35 of fifth pipe 30 is attached to, and extending vertically downwards from, first end 14A of first pipe 10A. Sixth pipe 32 has first end 39 and an opposite second end 41. First end 39 of sixth pipe 32 is attached to, and extending vertically downwards from, second end 15A of first pipe 10A. Similarly constructed to fifth pipe 30 and sixth pipe 32, are seventh pipe 31 and eighth pipe 33 located directly behind fifth pipe 30 and sixth pipe 32, respectively. Seventh pipe 31 and eighth pipe 33 extend vertically downwards and in parallel to each other.

Seventh pipe 31 mirrors fifth pipe 30, except that seventh pipe 31 extends downwardly from first end 17A of second pipe 11A. Eighth pipe 33 mirrors sixth pipe 32, except that eighth pipe 33 extends downwardly from second end 19A of second pipe 11A.

In the depicted embodiment, fifth pipe 30, sixth pipe 32, seventh pipe 31, and eighth pipe 33 are all equipped with spray nozzles 8 for spraying fluid onto ready mix truck 4 in accordance with ready mix truck wash system 2. Spray nozzles 8 located on the vertically extending pipes (fifth pipe 30, sixth pipe 32, seventh pipe 31, and eighth pipe 33) are similar to those located along the horizontally extending pipes (first pipe 10A, second pipe 11A, third pipe 12A, and fourth pipe 13A) in that each spray nozzle 8 has a first end attached to the pipe and have a second sprayer end that extends from the pipe at an approximately right angle. Spray nozzles 8 on vertically extending pipes (fifth pipe 30, sixth pipe 32, seventh pipe 31, and eighth pipe 33), however, extend horizontally with respect to the ground such that they extend in parallel with the horizontally extending pipes (first pipe 10A, second pipe 11A, third pipe 12A, and fourth pipe 13A).

Attached to a top side of first pipe 10A are two brackets 34 (illustrated schematically). Two brackets 34 are also attached to a top side of second pipe 11A, and additional brackets 34 can be located on any other pipe of spray arch 6A. In the depicted embodiment, brackets 34 have a lower end extending vertically upwards from any location along first pipe 10A and a central bent region that forms a right angle, such that an upper end of bracket can cooperate with an overhead frame formed with I-beams 36. Other bracket 34 configurations are contemplated. I-beams 36 receive brackets 34 to support the weight of spray arch 6A. Brackets 34 are configured to slide along I-beams 36 thereby allowing spray arch 6A to move in space and be customized to a particular customer's needs. For example, spray arch 6A can be adjusted forwards-backwards by sliding brackets 34 along the I-beams 36, upwards-downwards by extending or shortening brackets 34, and side-to-side by repositioning brackets 34 on first pipe 10A and second pipe 11A. Once spray arch 6A is positioned in the desired location, brackets 34 can be permanently secured to I-beams 36 with clamps, bolts, or any other suitable fastening means. In the alternative, brackets 34 may be left adjustable with respect to I-beams 36. I-beams 36 and brackets 34 suspend spray arch 6A in space for use with ready mix truck wash system 2.

Figure 5:
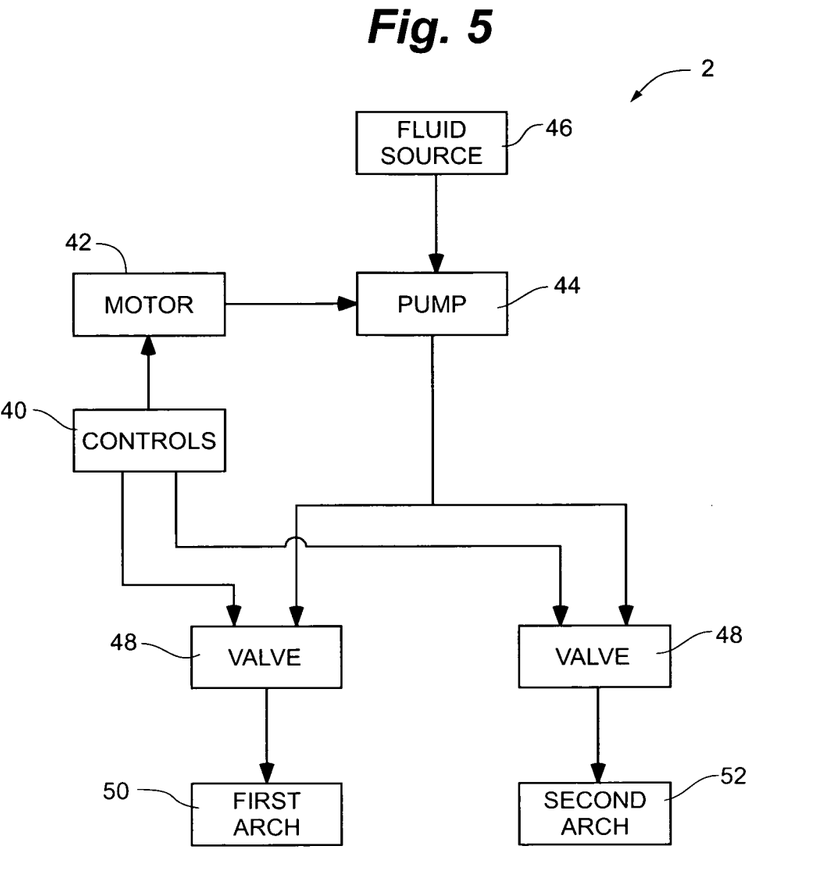
FIG. 5 is a block diagram showing the functional components of the ready mix truck wash system.

FIG. 5 is a block diagram showing the functional components of ready mix truck wash system 2. Controls 40 are the brains of truck wash system 2. Controls 40 include a timer for keeping track of predetermined time periods, and a button or other actuator for activating ready mix truck wash system 2. Actuation of controls 40 starts motor 42, which drives pump 44. Motor 42 can be any suitable motor such as, but not limited to, a 30 horsepower (HP) three-phase (3P) motor. Pump 42 can be any suitable pump such as, but not limited to, the 3545 pump manufactured by Cat Pumps. Pump 42 pulls liquid from liquid source 46 through valves 48. Valves 48 can be solenoid valves, or any other suitable valves, and are controlled by a timer within controls 40. According to a predetermined timing schedule, water is pulled through valves 48 and shunted to the pipes forming first spray arch 50 and second spray arch 52 for washing a truck. In an alternative embodiment, a single valve is employed in place of valves 48. The single valve is configured to selectively direct fluid into first spray arch 50 or second spray arch 52. The timer is connected to the single valve such that fluid is directed to first spray arch 50 for a first predetermined period of time, and then to second spray arch 52 for a second predetermined period of time.

First arch 50 and second arch 52 can be configured similarly to spray arch 6 (depicted in FIGS. 2 and 3) or spray arch 6A (depicted in FIG. 4). It is not necessary that first arch 50 and second arch 52 have identical constructions. For example, first spray arch 50 can be constructed similarly to spray arch 6, while second spray arch 52 can be constructed similarly to spray arch 6A. The button or actuator of controls 40 activates ready mix truck wash 2. When so activated, water (or any other pressurized fluid) is shunted into first arch 50 for a first predetermined amount of time called "stage one". After completion of the first predetermined amount of time, water is no longer shunted to first arch 50 indicating that stage one is complete. At this point, the timer in controls 40 may impose a delay for a second predetermined amount of time where no water is allowed to escape into the pipes and/or out of the nozzles. This intentional delay would allow for a truck driver to move ready mix truck 4 with respect to stationary ready mix truck wash system 2. Once the delay is complete, water is shunted into second arch 52 for a third predetermined amount of time called "stage two". After completion of the third predetermined amount of time, water is no longer shunted to second arch 52 indicating that stage two is complete. It should be appreciated that more than two stages can be used in accordance with this invention. It also should be appreciated that more or less than two arches can be used in accordance with this invention. Further, the number of stages need not directly correlate with the number of arches. Using spray arch 6A of FIG. 4 as an example, water can be shunted to first pipe 10A, fifth pipe 30, and sixth pipe 32 during a first stage, and shunted to pipes second pipe 11A, seventh pipe 31, and eighth pipe 33 during a second stage, such that a single spray arch 6A is used in two stages.

In cold climates, controls 40 can also include a freeze protection mode. After use of ready mix truck wash system 2, an operator can activate the freeze protection mode by simply flipping a switch or other actuator located in controls 40. When the switch is placed in an "on" position, controls 40 will not allow pump 44 to draw fluid from fluid source 46. Either before or after placing the switch in "on" position, an operator can physically close a ball valve located on the pump and turn on an air source such that air, instead of pressurized fluid such as water, flows through valves 48. Air flowing through valves 48 will travel into first arch 50 and second arch 52, thereby forcing any liquid remaining in ready mix truck wash system 2 out of spray nozzles 8. After a sufficient amount of time has passed, ready mix truck wash system 2 will be purged of liquid and therefore, protected from damage caused by freezing liquids such as water.

Figure 6:
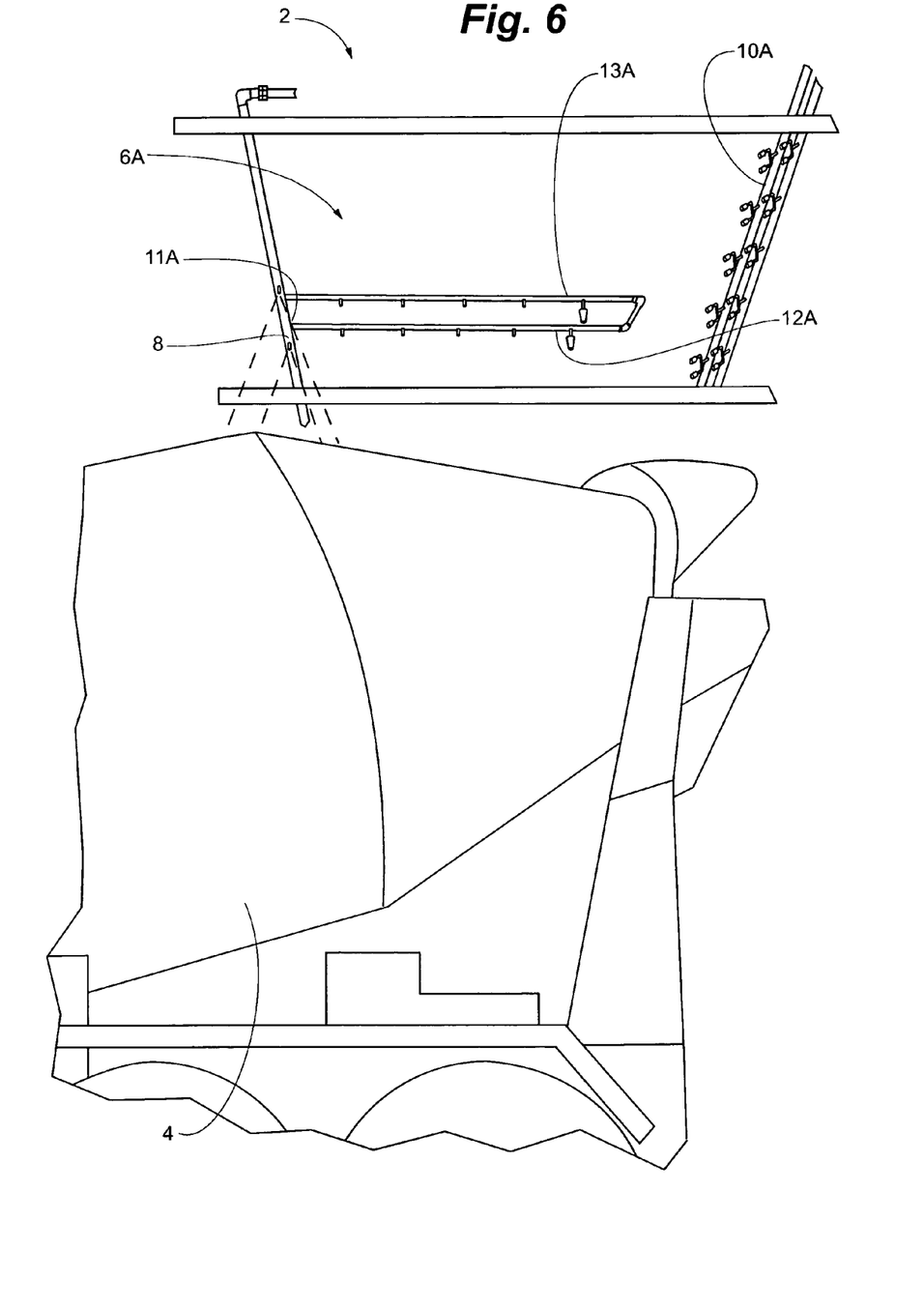
FIG. 6 is a perspective view depicting a first stage of the ready mix truck wash system.
Figure 7:
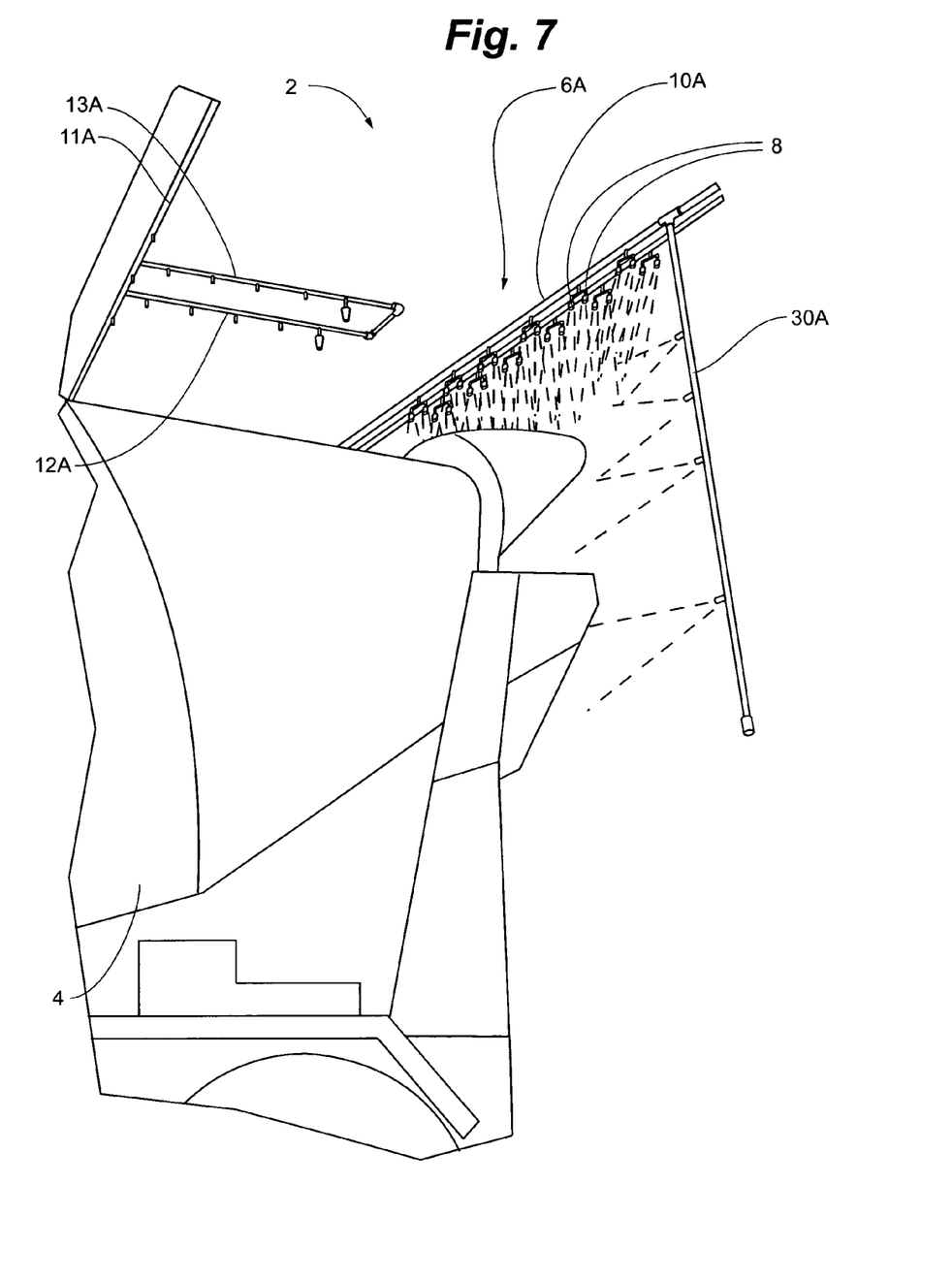
FIG. 7 is a perspective view depicting a second stage of the ready mix truck wash system.

FIGS. 6 and 7 are a series of drawings intended to further illustrate the staged wash method described above. FIG. 6 is a perspective view of truck 4 in stage one of truck wash system 2A Visible in FIG. 6 are the pipes of first spray arch 6A including first pipe 10A, second pipe 11A, third pipe 12A, and fourth pipe 13A. Of note, third pipe 12A and fourth pipe 13A are both attached to second pipe 11A, but not first pipe 10A. Further, only spray nozzles 8 located on second pipe 11A are in an "on" position during stage one of this particular truck wash system 2A. This customer decided not to use spray nozzles 8 located on first pipe 10A, third pipe 12A, or fourth pipe 13A during stage one of truck wash system 2A. After a first predetermined amount of time passes, stage one is completed and water stops flowing to nozzles 8. A built-in delay lasting for a second predetermined amount of time allows a truck driver to advance truck 4 into a new position relative to the first spray arch 6A and commence stage two of the truck wash system 2A.

FIG. 7 follows FIG. 6 in time, and is a perspective view of truck 4 in stage two of truck wash system 2A. Visible in FIG. 7 are the pipes of first spray arch 6A including first pipe 10A, second pipe 11A, third pipe 12A, fourth pipe 13A, and fifth pipe 30A. Of note, third pipe 12A and fourth pipe 13A are attached to second pipe 11A, but not first pipe 10A. During stage two of this particular truck wash system 2A, only spray nozzles 8 located on horizontal first pipe 10A and vertical fifth pipe 30A are in an "on" position, while spray nozzles 8 located on second 11A, third pipe 12A, and fourth pipe 13A remain in an "off" position. Since nozzles 8 on third pipe 12A and fourth pipe 13A were not used in either stage one or stage two of truck wash system 2A, these nozzles 8 may be permanently plugged or otherwise inactivated. After a third predetermined amount of time passes, stage two is completed and water no longer exits spray nozzles 8. For a two stage system such as truck wash system 2A depicted, the wash cycle is then complete.

Figure 8:
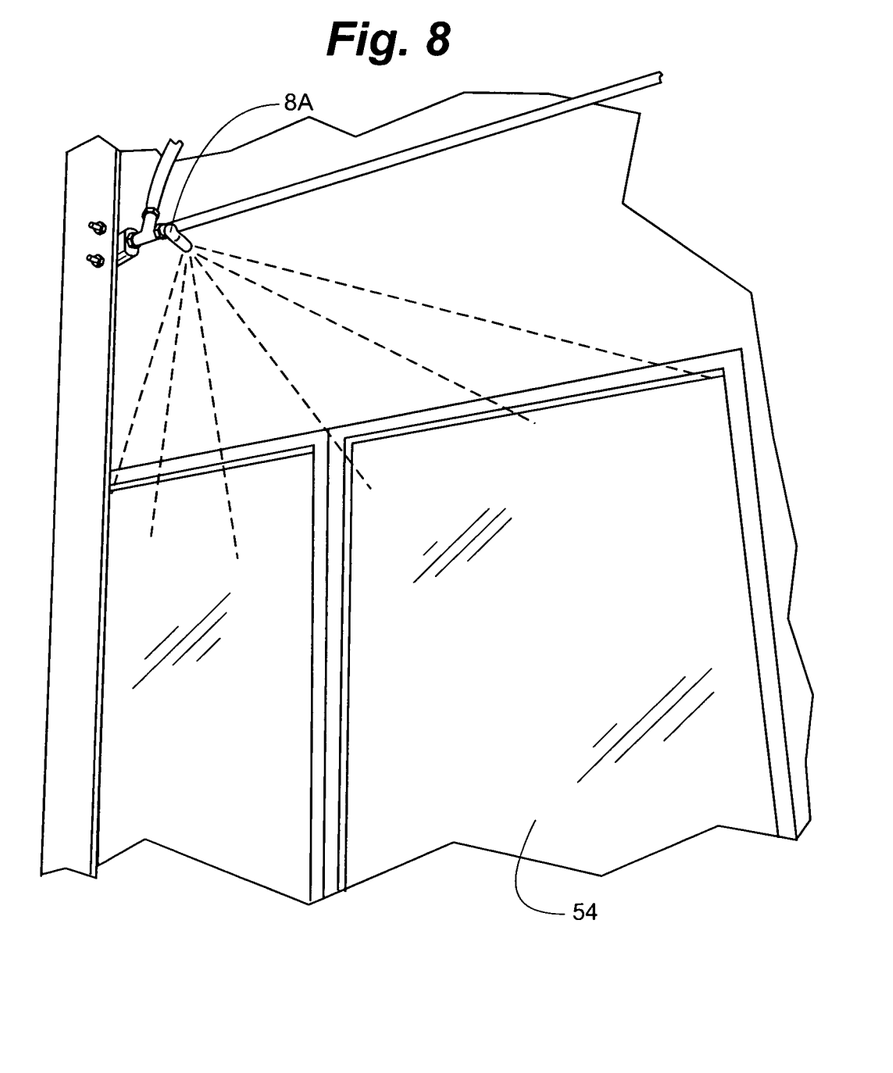
FIG. 8 is a perspective view of an attachment spray nozzle for use with the ready mix truck wash system.
Figure 9:
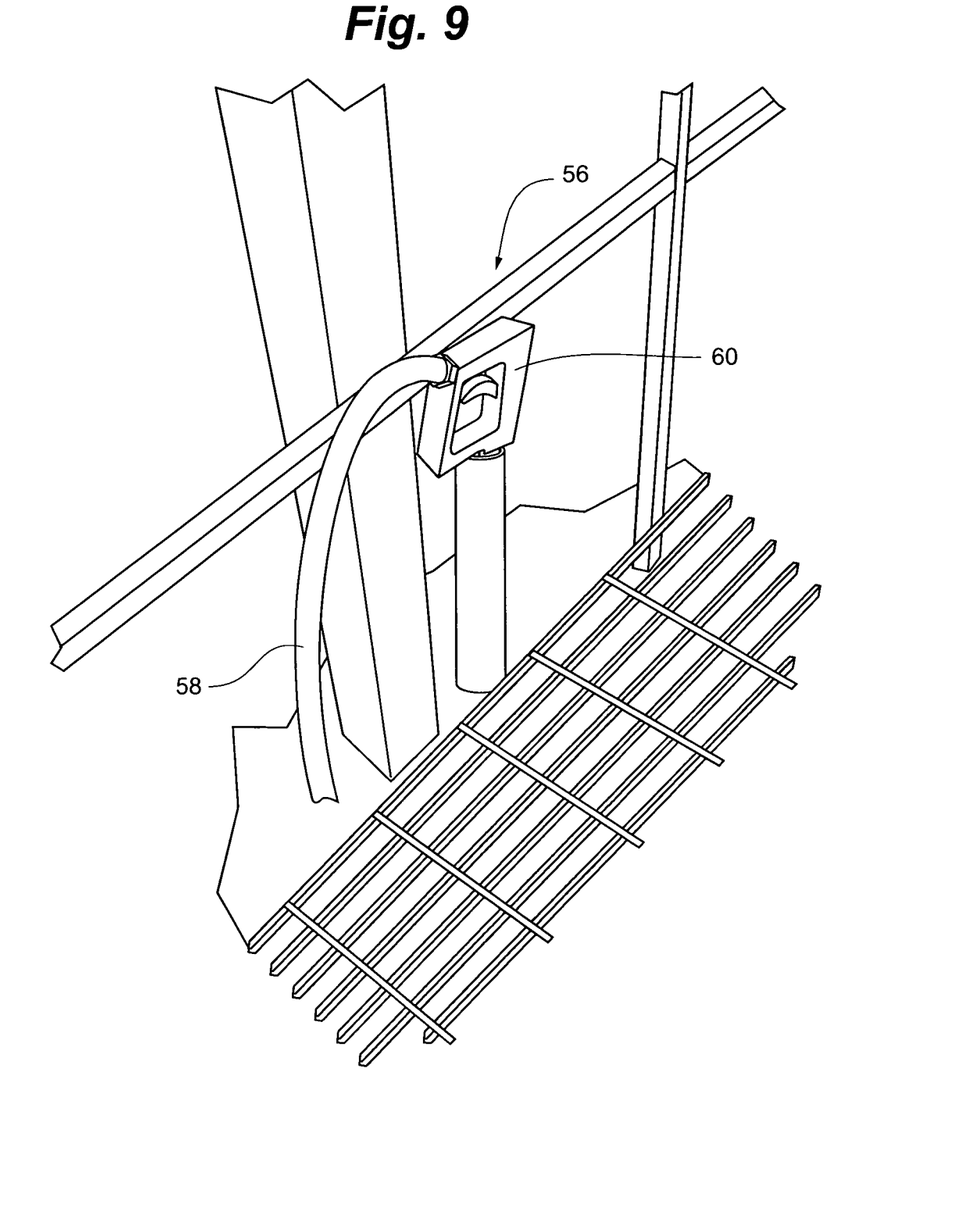
FIG. 9 is a perspective view of a spray gun for use with the ready mix truck wash system.

FIGS. 8 and 9 show auxiliary add-on options to further customize truck wash system 2A. FIG. 8 depicts auxiliary spray nozzle 8A permanently directed at window 54 of an adjacent building. Auxiliary spray nozzle 8A can be fluidly connected to pump 44 and controlled by controls 40. A customer can choose to intermittently activate spray nozzle 8A and spray window 54 with pressurized fluid to keep window 54 clean and free of debris offering a more clear view of truck wash system 2A. FIG. 9 depicts spray gun 56 having tubing 58 attached to truck wash system 2A and spray handle 60 for hand-held cleaning of tools and the like. Auxiliary spray nozzle 8A and/or spray gun 56 are fluidly connected via tubing or pipes to pump 44 and motor. Auxiliary spray nozzle 8A and/or spray gun 56 are fluidly connected via tubing or pipes to pump 44 and motor. One or more of such accessories are contemplated for further tailoring of the truck wash system 2 described herein.

Described above is a highly customizable wash system for ready mix trucks. Spray arches in accordance with the present invention can be tailored to meet the needs of a variety of customers. Spray arches can be adjusted upwards and downwards, forwards and backwards, as well as side to side before being secured with I-beam mounting. Additional piping, such as vertically depending pipes, can be added or subtracted from the basic spray arch, depending on the area of a truck that needs washing. Likewise, spray nozzles can be turned on and off according to a customer's instructions. Further still, a staged wash system can be used to tailor the wash delivered. Other custom options include adding a wash bin to collect sprayed fluid, an auxiliary spray nozzle, and/or a hand held spray gun.

Although the present invention has been described with reference to preferred embodiments, workers skilled in the art will recognize that changes may be made in form and detail without departing from the spirit and scope of the invention.

The invention claimed is:

1. A truck wash system comprising:
a first spray arch comprising:
first and second pipes extending horizontally and in parallel;
third and fourth pipes extending horizontally and in parallel, the third and fourth pipes being arranged at a positive angle with respect to the first and second pipes;
brackets extending vertically upwards from the first and second pipes to suspend the first spray arch from one or more I-beams, the brackets being movable along the one or more I-beams during installation of the first spray arch and fixed to the one or more I-beams such that the first spray arch is stationary during use of the truck wash system; and a plurality of spray nozzles located along each of the first, second, third, and fourth pipes for directing pressurized fluid at a truck;

a pump for supplying pressurized fluid to the pipes;

a motor for driving the pump; and controls for starting the motor to initiate the truck wash system.

2. The system of claim 1, wherein the first, second, third, and fourth pipes are coplanar.

3. The system of claim 1, wherein the third and fourth pipes are attached to central locations of the first and second pipes to form a structure resembling a ladder.

4. The system of claim 1, wherein the third and fourth pipes are perpendicular to the first and second pipes.

5. The system of claim 1, wherein the first spray arch further comprises:

fifth and sixth pipes extending vertically downwards from a first end and a second end of the first pipe, respectively.

6. The system of claim 5, wherein the first spray arch further comprises:

seventh and eighth pipes extending vertically downwards from a first end and a second end of the second pipe, respectively.

7. The system of claim 1, further comprising:

a second spray arch located adjacent to the first spray arch;

a valve configured to selectively direct fluid into the first spray arch or the second spray arch; and a timer connected to the valve such that fluid is directed to the first spray arch for a first predetermined period of time, and then to the second spray arch for a second predetermined period of time.

8. The system of claim 1, wherein the controls include an actuator for pumping air through the first spray arch to purge the pipes of pressurized fluid.

9. The system of claim 1, further comprising:

a spray gun fluidly connected to the pump, the spray gun being removable from a housing, wherein the housing is detached from the first spray arch.

10. The system of claim 1, further comprising:

an auxiliary spray nozzle fluidly connected to the pump, the auxiliary spray nozzle being detached from the first spray arch and positioned to spray pressurized fluid onto a window.

* * * * *